(12) United States Patent
Tsai

(10) Patent No.: US 7,914,159 B2
(45) Date of Patent: Mar. 29, 2011

(54) METHOD FOR MANUFACTURING LENS USING OPAQUE OR SEMI-OPAQUE MATERIAL

(75) Inventor: Ming-Chiang Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 408 days.

(21) Appl. No.: 12/142,161

(22) Filed: Jun. 19, 2008

(65) Prior Publication Data

US 2009/0153973 A1 Jun. 18, 2009

(30) Foreign Application Priority Data

Nov. 20, 2007 (CN) .......................... 2007 1 0202595

(51) Int. Cl.
*B29D 11/00* (2006.01)
*G02B 23/16* (2006.01)

(52) U.S. Cl. ......... 359/611; 359/900; 264/1.7; 264/1.32

(58) Field of Classification Search .................. 359/611, 359/642, 738–740, 811, 818, 819, 830, 900; 264/1.1, 1.32, 1.7
See application file for complete search history.

(56) References Cited

U.S. PATENT DOCUMENTS

| | | | | |
|---|---|---|---|---|
| 6,426,839 | B2 * | 7/2002 | Dou et al. | 359/823 |
| 6,469,832 | B2 * | 10/2002 | Yotsuya et al. | 359/619 |
| 7,354,536 | B2 * | 4/2008 | Hiranuma | 264/1.32 |
| 7,602,678 | B2 * | 10/2009 | Takeo et al. | 369/44.15 |
| 7,639,435 | B2 * | 12/2009 | Chiang | 359/819 |
| 2005/0018280 | A1 * | 1/2005 | Richardson | 359/368 |

FOREIGN PATENT DOCUMENTS

| | | |
|---|---|---|
| CN | 1836183 A | 9/2006 |
| JP | 02226102 A * | 9/1990 |

* cited by examiner

*Primary Examiner* — Frank G Font
(74) *Attorney, Agent, or Firm* — Andrew C. Cheng

(57) ABSTRACT

An exemplary lens (50) includes a central transparent portion (44) and a peripheral portion (35). The central transparent portion is configured for converging or diverging the light beams transmitted therethrough. The peripheral portion surrounds and extends from the central transparent portion. The peripheral portion is comprised of a shading material.

6 Claims, 12 Drawing Sheets

METHOD FOR MANUFACTURING LENS USING OPAQUE OR SEMI-OPAQUE MATERIAL

BACKGROUND

1. Technical Field

The present invention relates to lenses, and particularly to a lens and a method for manufacturing the same.

2. Description of Related Art

In recent years, optical modules for taking photos have been widely used in mobile terminals, such as mobile phones and lap-top computers.

Optical modules typically include a barrel, a number of lenses, and a filter. The plurality of the lenses and the filter are received in the barrel. Generally, each of the lenses includes a central transparent portion and a peripheral portion. The central transparent portion is configured for converging or diverging the light beams. The peripheral portion surrounds and extends from the central transparent portion. The central transparent portion and the peripheral portion are usually integrally formed. Since a typical material of the central transparent portion and the peripheral portion is a transparent plastic material, a spacer is desirable to be disposed between neighboring lenses to prevent the light beams transmitting through the peripheral portion and resulting in inferior image quality.

However, the application of the spacer does not satisfy the oft-conflicting requirements of compactness and low cost.

What is needed, therefore, is a lens which can be easily and compactly assembled into the optical module.

SUMMARY

One embodiment provides a lens. The lens includes a central transparent portion and a peripheral portion. The central transparent portion is configured for converging or diverging the light beams transmitted therethrough. The peripheral portion surrounds and extends from the central transparent portion. The peripheral portion is comprised of a shading material, e.g. an opaque or a semi-opaque material.

Another embodiment provides a method for manufacturing a lens, includes the following steps: providing an apparatus including a cover die, a peripheral portion mold, and a central transparent portion mold, attaching the peripheral portion mold to the cover die, thereby the cover die and the peripheral portion mold cooperative defining a first receiving room; injecting a molten opaque or semi-opaque material into the first receiving room; forming a peripheral portion of the lens in the first receiving room; attaching the central transparent portion mold to the cover die, thereby the cover die, the peripheral portion and the central transparent portion mold cooperatively defining a second receiving room; injecting a molten transparent plastic material into the second receiving room; and forming a central transparent portion of the composite lens.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below and with reference to the drawings.

Figure 1:
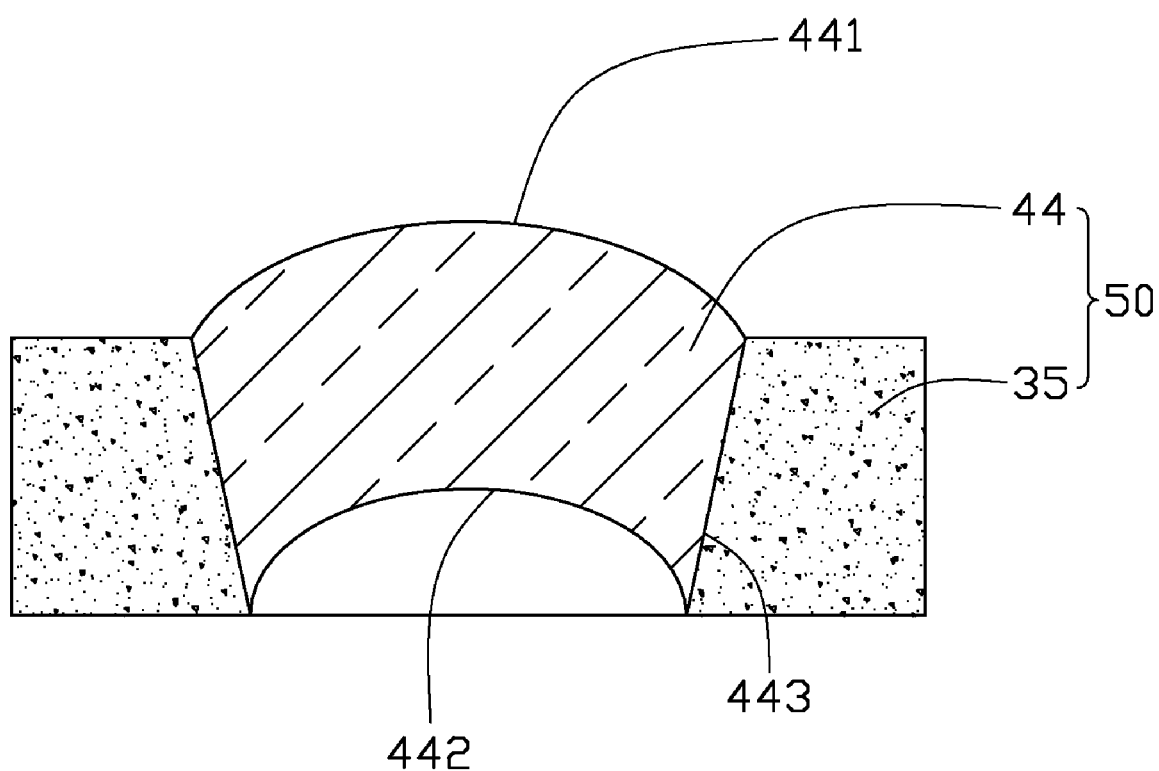
FIG. 1 is a schematic, cross-sectional view of a lens according to a first embodiment of the present invention.

Referring to FIG. 1, an exemplary lens 50, according to a first embodiment, includes a central transparent portion 44 and a peripheral portion 35.

The central transparent portion 44 is configured for converging or diverging the light beams. The central transparent portion 44 has a first surface 441, a second surface 442 facing away from the first surface 441, and a surrounding surface 443 surrounding and adjacent to both the first surface 441 and the second surface 442. One of the first surface 441 and the second surface 442 can be an aspherical surface. The surrounding surface 443 is a cone surface. In the present embodiment, the first surface 441 is a convex aspherical surface that curves or bulges outward, and the second surface 442 is a concave aspherical surface that curves or bulges inward.

The peripheral portion 35 surrounds and extends from the central transparent portion 44. The central transparent portion 44 and the peripheral portion 35 are integrally formed. The central transparent portion 44 can be made of a transparent plastic material including but not limited to cyclic olefin copolymer (COC), polymethylmethacrolate (PMMA), polycarbonate (PC), PC and/or PMMA, and polyetherimide (PIE). The peripheral portion 35 can be made of an opaque or a semi-opaque material including but not limited to liquid crystalline polymers, polycarbonate, and poly (acrylonitrile-butadiene-styrene).

Figure 4:
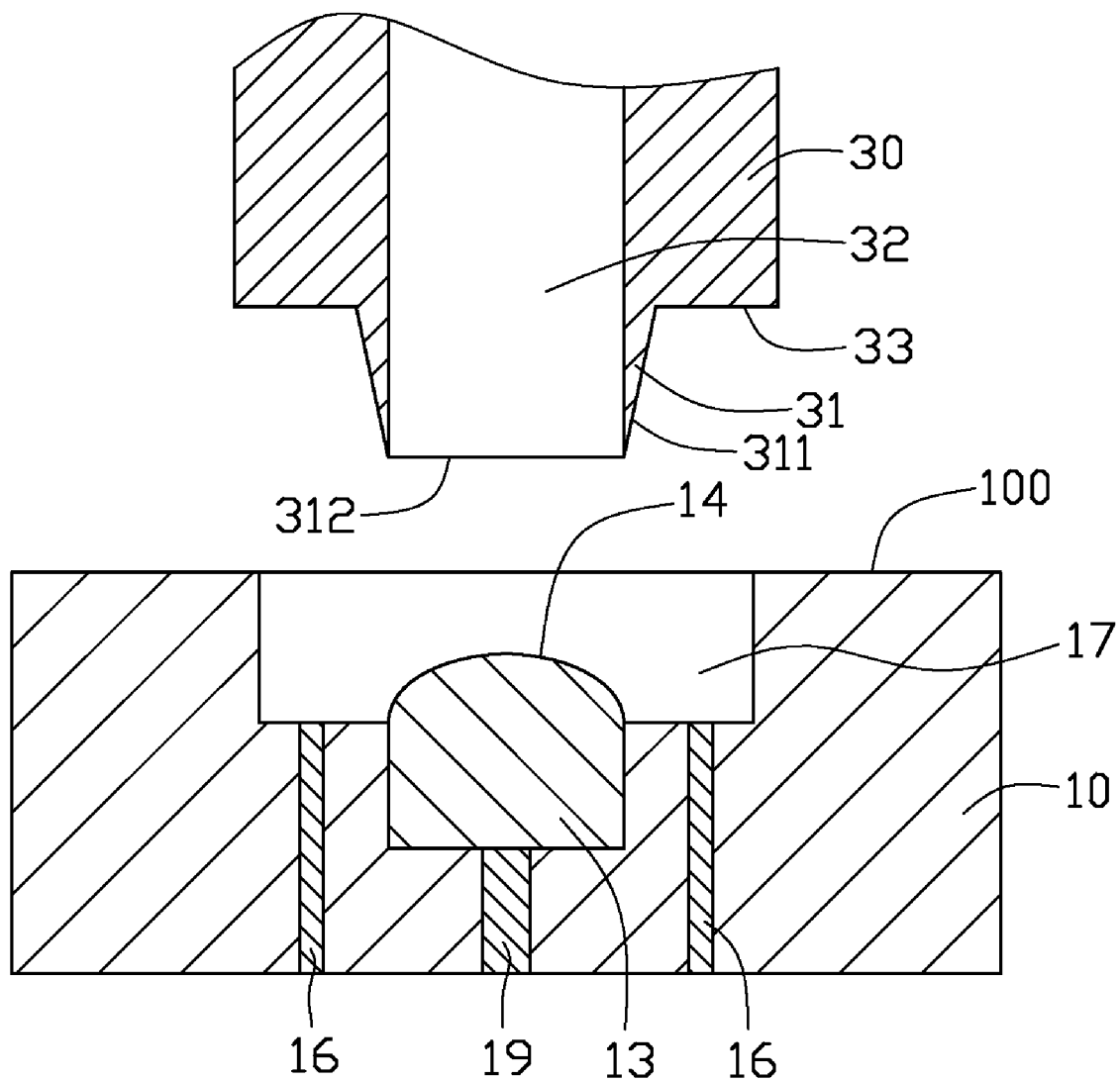
FIG. 4 is a schematic, cross-sectional view of the apparatus according to the second embodiment of the present invention, in which a peripheral portion mold is shown.
Figure 5:
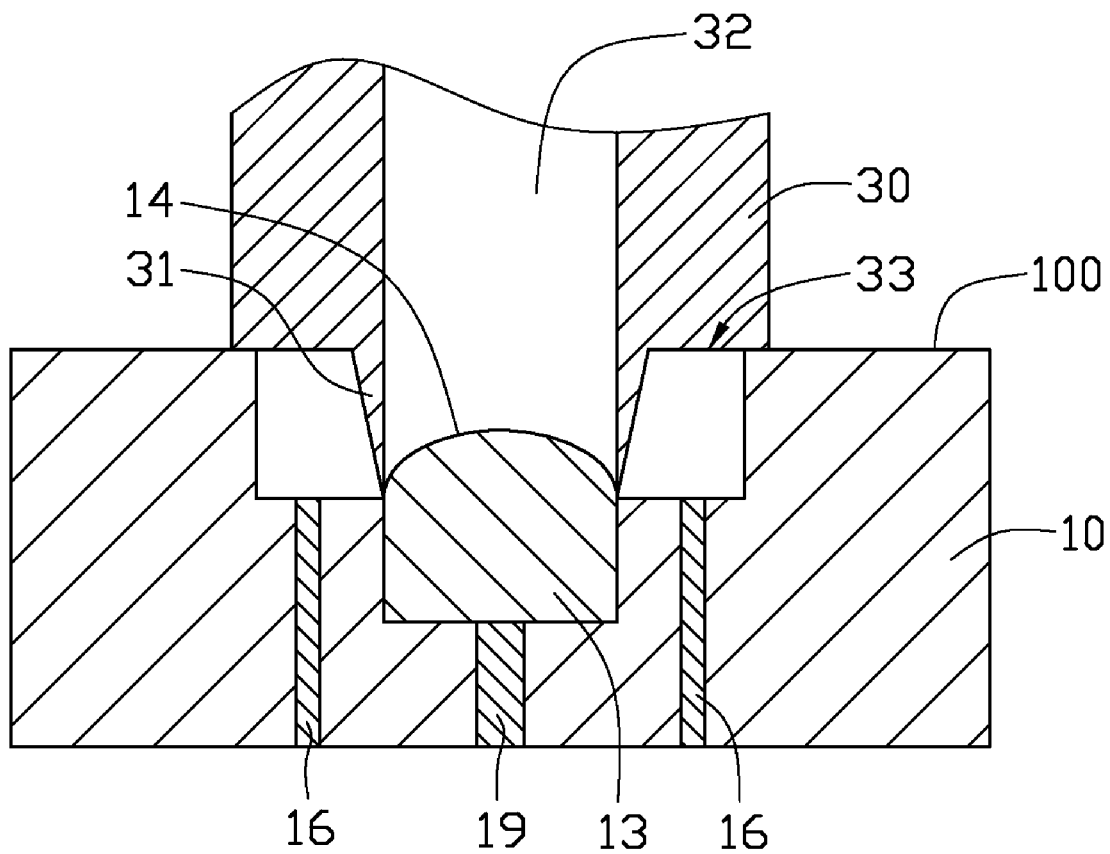
FIG. 5 is a schematic, cross-sectional view of the apparatus in FIG. 4, in which the peripheral portion mold is mounted.
Figure 6:
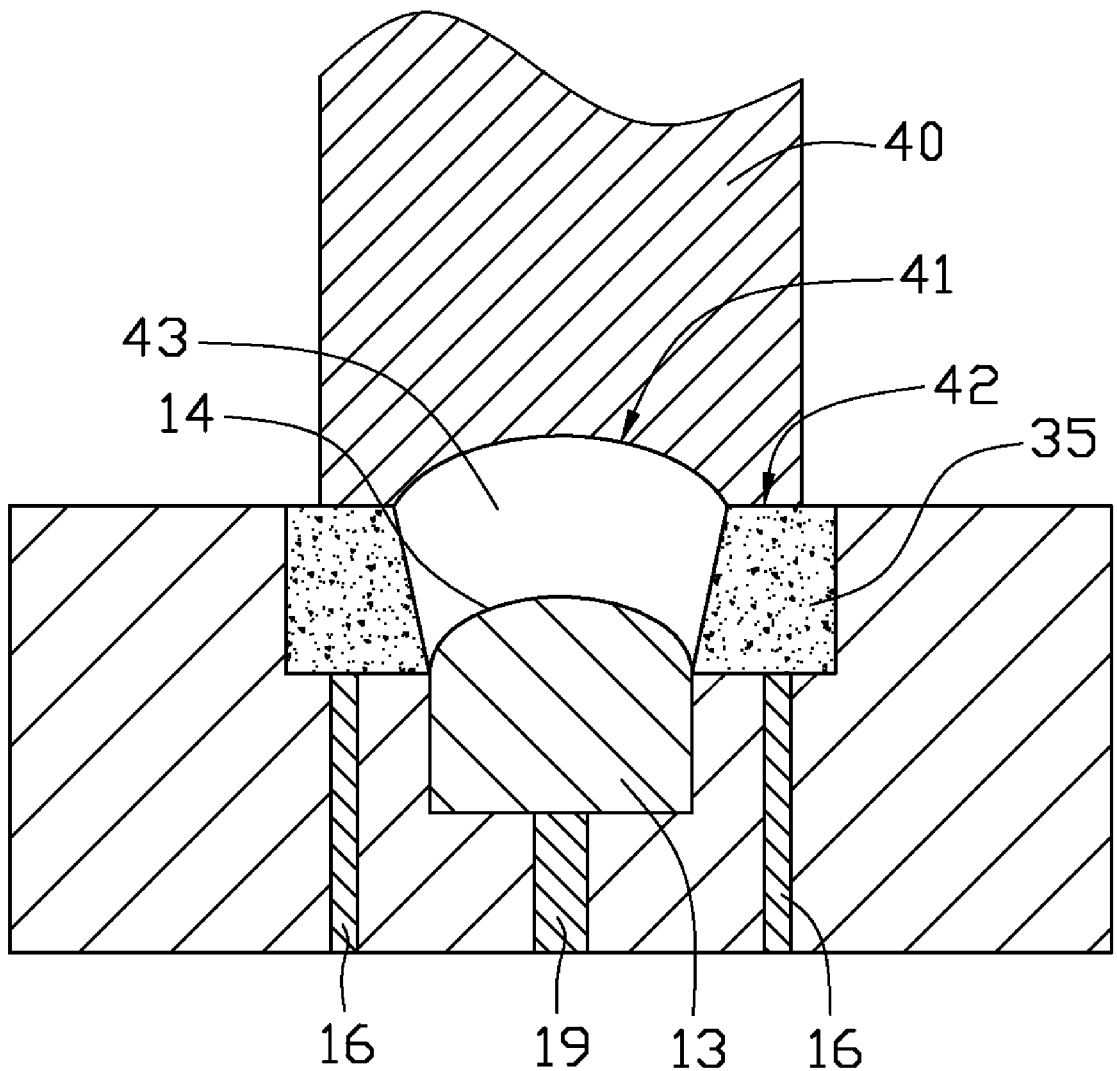
FIG. 6 is a schematic, cross-sectional view of the apparatus according to the second embodiment of the present invention, in which a central transparent portion mold is shown.

Referring to FIGS. 2 to 6, an apparatus for manufacturing the lens 50 in the first embodiment, according to a second embodiment, includes a cover die 10, a charging barrel 20 (refer to FIGS. 2 and 3), a peripheral portion mold 30 (refer to FIGS. 4 and 5), and a central transparent portion mold 40 (refer to FIG. 6).

Figure 2:
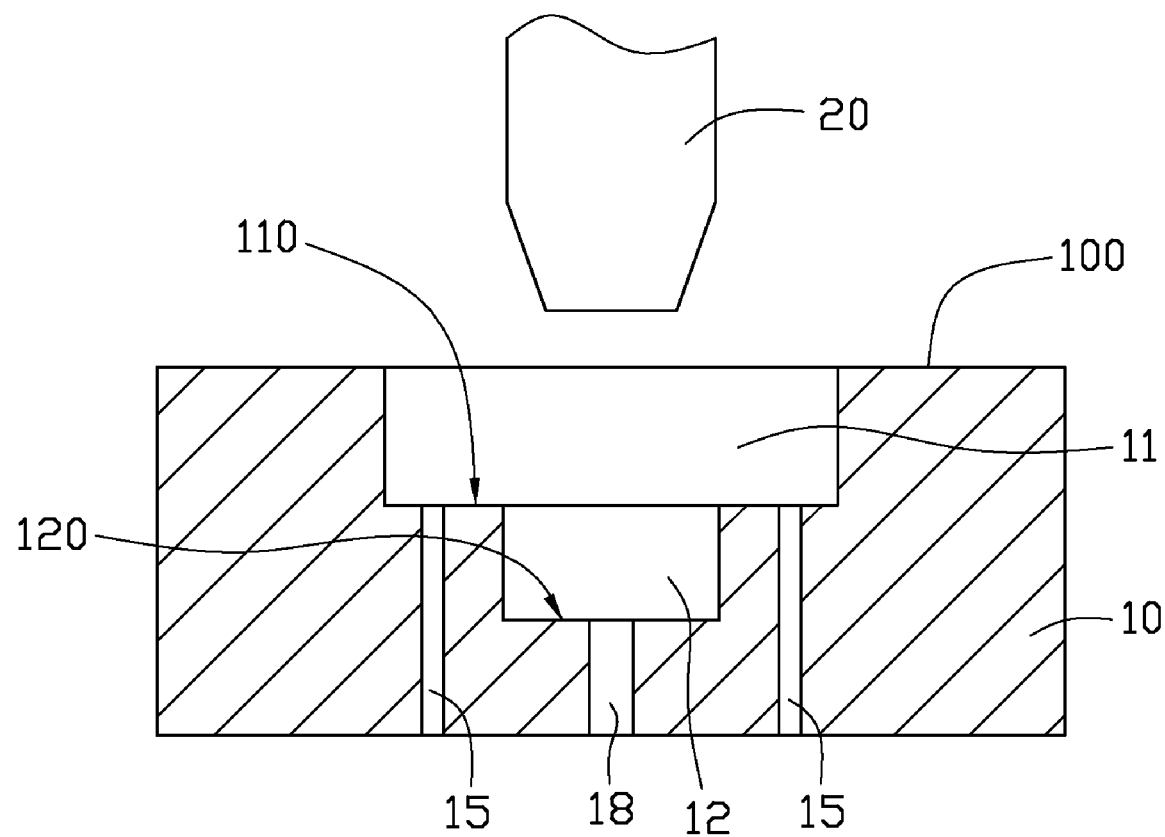
FIG. 2 is a schematic, cross-sectional view of an apparatus according to a second embodiment of the present invention, in which a charging barrel is shown.

Referring to FIG. 2, the cover die 10 includes a top surface 100, the top surface 100 defines a first cylinder shaped groove 11. The principal axis of the groove 11 is perpendicular to the top surface 100 of the cover die 10. The cover die 10 includes a bottom surface 110 in the groove 11. The bottom surface 110 is parallel with the top surface 100. A second cylinder shaped groove 12 is defined at the central transparent portion of a bottom surface 110. The second groove 12 communicates with the first groove 11. Size of the second groove 12 is smaller than that of the first groove 11.

The bottom surface 110 also defines two first pinholes 15. The first pinholes 15 are symmetrically disposed around the second groove 12. The extending direction of each of the first pinholes 15 is perpendicular to the bottom surface 110. A second pinhole 18 is defined on a bottom surface 120 of the second groove 12. The extending direction of the second pinhole 18 is perpendicular to the bottom surface 120.

Figure 3:
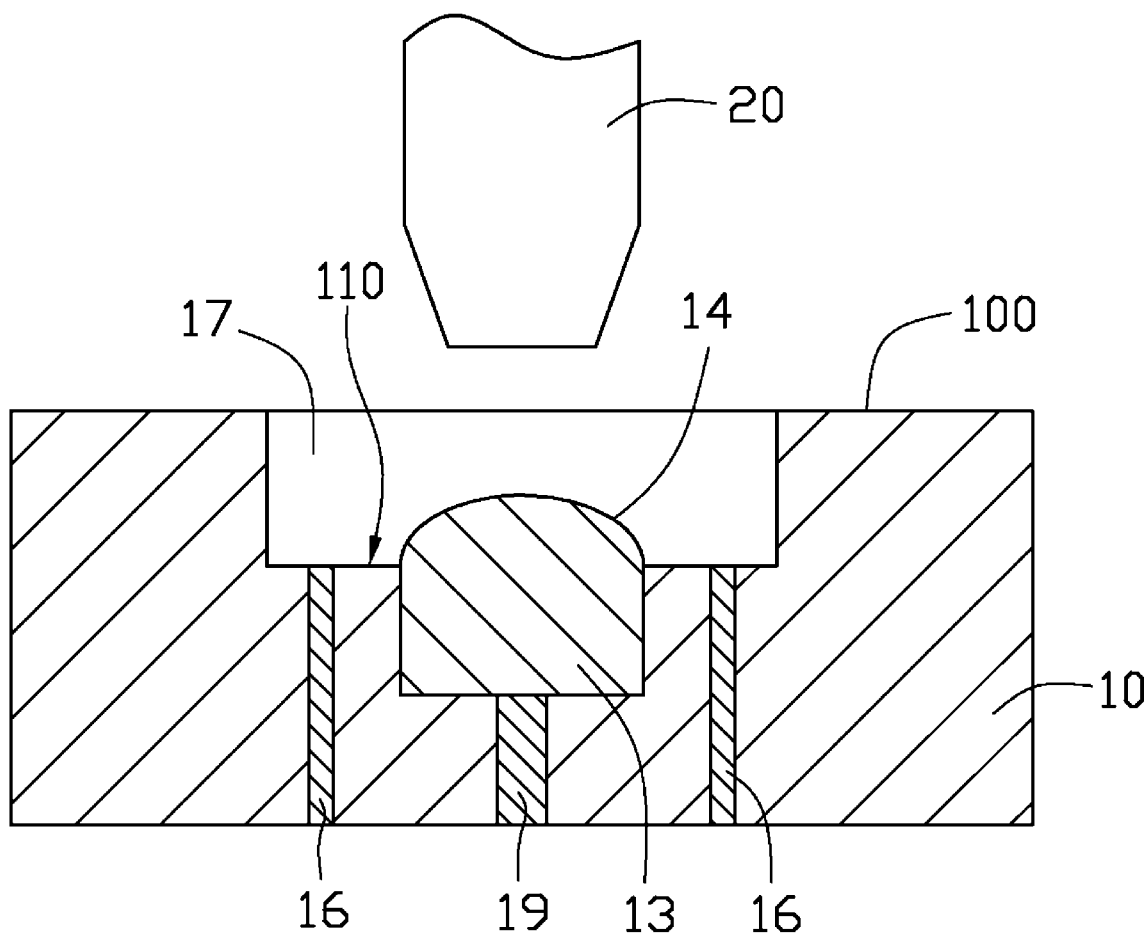
FIG. 3 is a schematic, cross-sectional view of the apparatus in FIG. 2 in which two first ejector pins, a second ejector pin, and a core are shown.

Referring to FIG. 3, a core 13 is inserted into and matingly received in the second groove 12. The core 13 is cylinder shaped and includes a first molding surface 14 facing away from the second pinhole 18. In this embodiment, the first molding surface 14 is a convex aspherical surface. The first molding surface 14 protrudes outwardly from the bottom surface 110 of the first groove 11. The shape of the first molding surface 14 is similar with the shape of the second surface 442 of the central transparent portion 44.

Two first ejector pins 16 are respectively received in the first pinholes 15. In addition, a second pin 19 is received in the second pinhole 18. The side wall of the first groove 11, the first molding surface 14, and end faces of the first ejector pins 16 cooperatively define a first receiving room 17.

The charging barrel 20 is configured for injecting a fused molten mass of material of the lens 50 into the first receiving room 17.

Referring to FIGS. 4 and 5, one end face 33 of the peripheral portion mold 30 defines a convex stage 31. The convex stage 31 includes a side surface 311 and an end 312 facing away from the end face 33. The end 312 of the convex stage 31 is parallel with the end face 33 of the mold 30. The shape of the side surface 311 is similar with that of the surrounding surface 443 of the central transparent portion 44. The end 312 defines a vacuum through hole 32 thereon. The diameter of the vacuum through hole 32 is equal to that of the core 13, so that the vacuum through hole 32 can matingly contact the edge of the first molding surface 14. The outer diameter of the peripherl portion mold 30 is larger than that of the first groove 11. The outer diameter of the side surface 311 is smaller than that of the first groove 11, but larger than that of the core 13. The depth of the convex stage 31 measured from the end face 33 is equal to that of the first groove 11 measured from the top surface 100. The vacuum through hole 32 is configured for drawing the fused molten mass of the material out therefrom to separate the material from the first molding surface 14.

Referring to FIG. 6, one end face 42 of the central transparent portion mold 40 defines a second molding surface 41. In this embodiment, the second molding surface 41 is a concave aspherical surface. The shape of the second molding surface 41 is similar with the shape of the first surface 441 of the central transparent portion 44.

Figure 7:
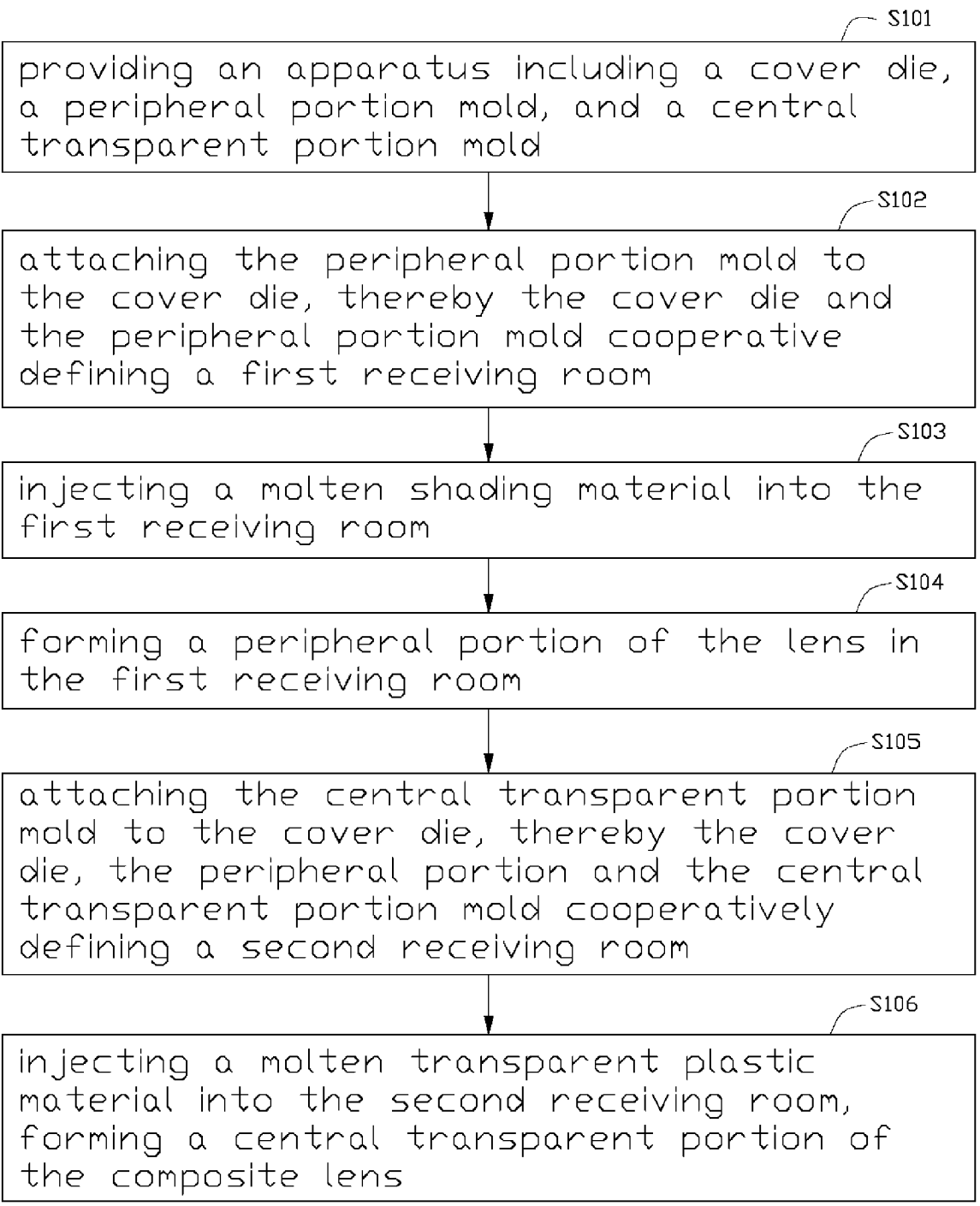
FIG. 7 is a flow chart of a method for manufacturing a lens in accordance with a third embodiment of the present invention.

Referring to FIG. 7, a method for manufacturing the lens 50, using the apparatus described in the second embodiment, includes the following steps: providing an apparatus including a cover die, a peripheral portion mold, and a central transparent portion mold (step 101); attaching the peripheral portion mold to the cover die, thereby the cover die and the peripheral portion mold cooperative defining a first receiving room (step 102); injecting a molten shading material into the first receiving room (step 103); forming a peripheral portion of the lens in the first receiving room (step 104); attaching the central transparent portion mold to the cover die, thereby the cover die, the peripheral portion and the central transparent portion mold cooperatively defining a second receiving room (step 105); injecting a molten transparent plastic material into the second receiving room; and forming a central transparent portion of the composite lens (step 106).

Referring to FIGS. 3 to 6 again, in step 101 and step 102, the apparatus in the second embodiment is provided. Two first ejector pins 16 are received in the first pinholes 15. The second pin 19 is received in the second pinhole 18. The core 13 is inserted into and matingly received in the second groove 12. The side wall of the first groove 11, the first molding surface 14, and the end faces of the first ejector pins 16 cooperatively define the first receiving room 17.

Figure 8:
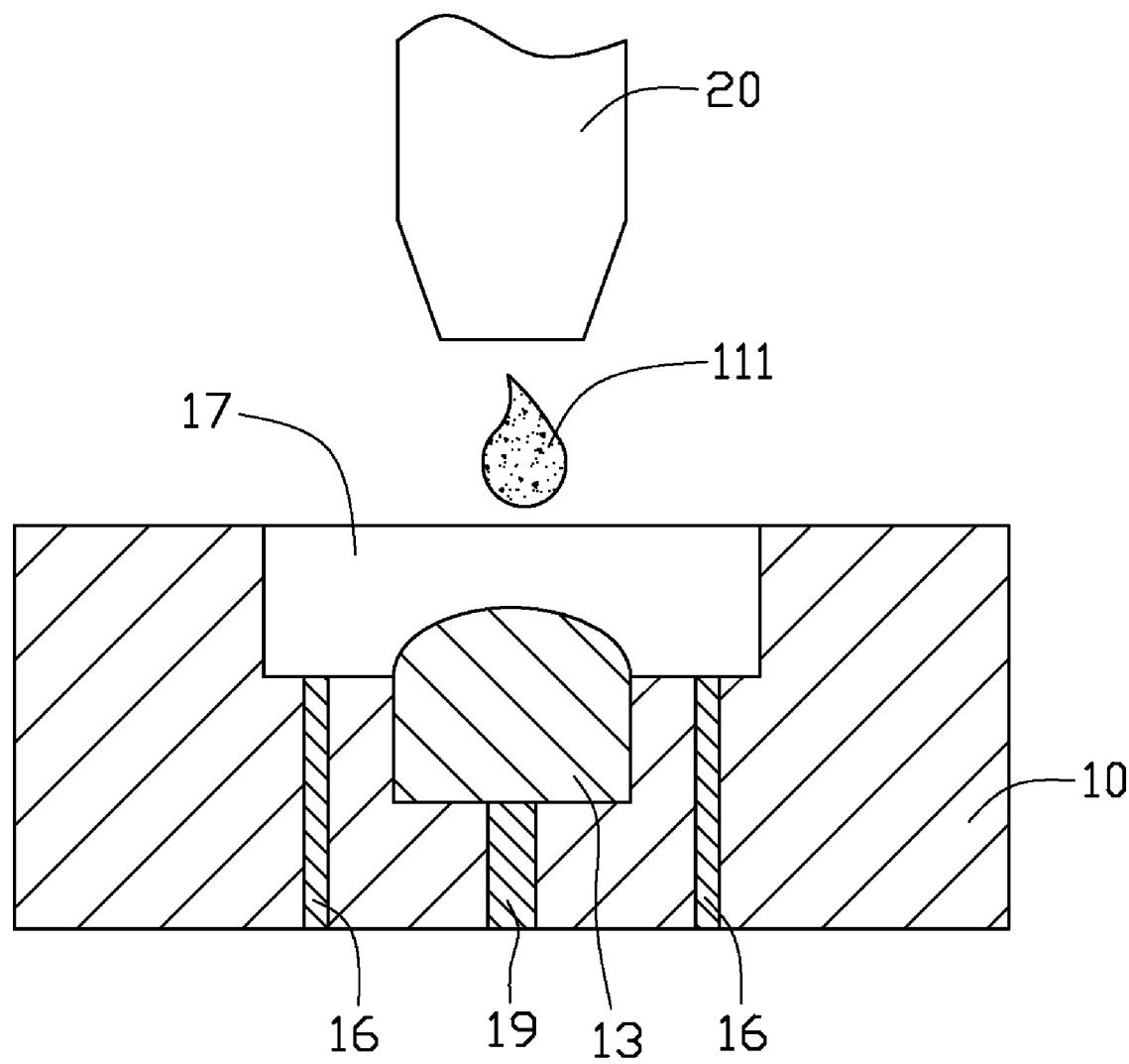
FIGS. 8 to 12 are schematic views of the process of the method in accordance with the third embodiment of the present invention.

Referring to FIG. 8, in step 103, a fused molten mass of the opaque material is injected into the first receiving room 17 by the charging barrel 20. The opaque material is selected from the group consisting of liquid crystalline polymers, polycarbonate, and poly (acrylonitrile-butadiene-styrene) blends. In this embodiment, the opaque material is liquid crystalline polymers.

Figure 9:
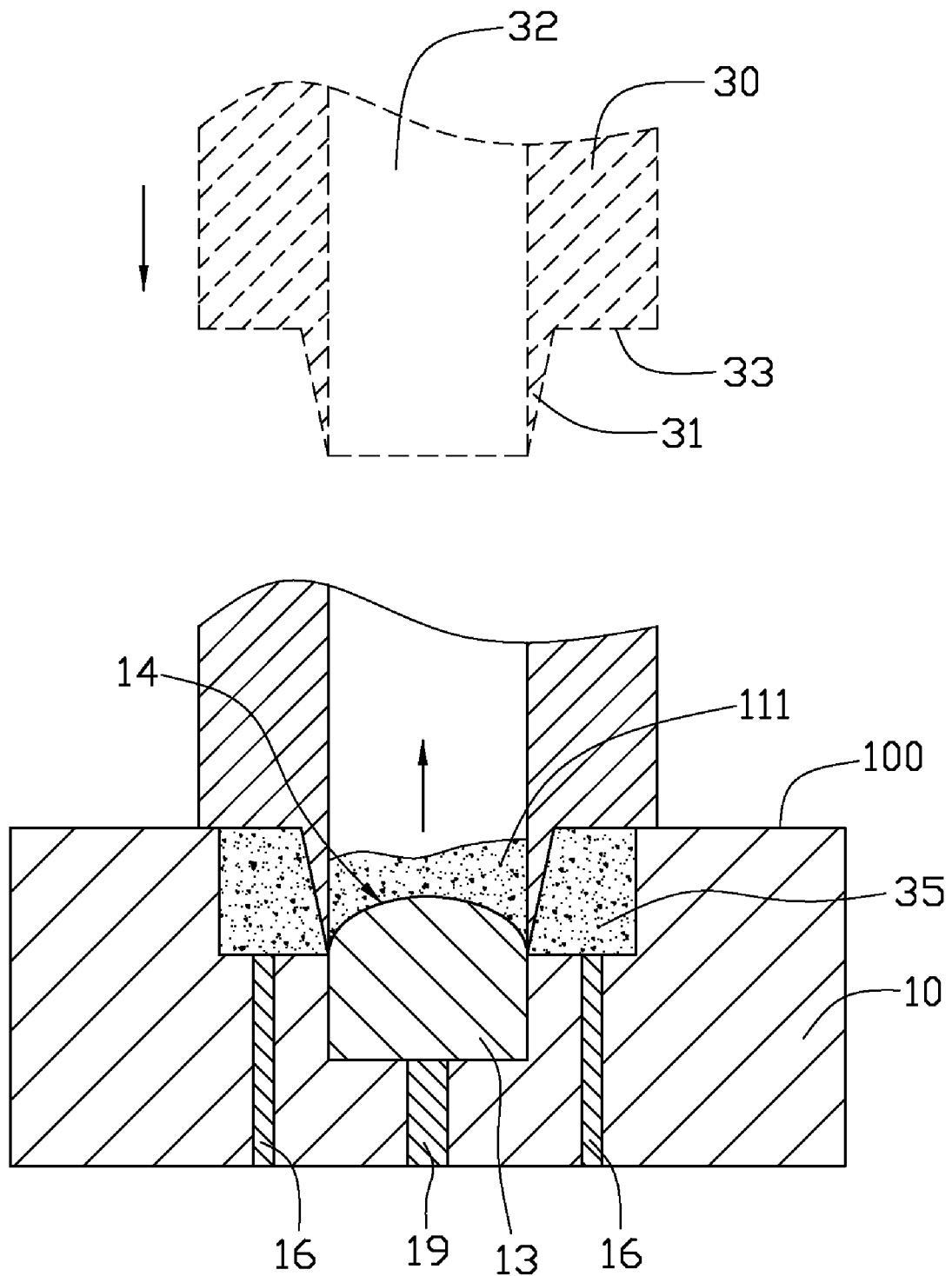

Referring to FIG. 9, in step 104 and step 105, the peripheral portion mold 30 is mounted in the first receiving room 17. Firstly, the convex stage 31 of the peripheral portion mold 30 is set facing the core 13. The peripheral portion mold 30 moves towards the core 31 till the end 312 of the convex stage 31 contacts the edge of the first molding surface 14. Since the first molding surface 14 protrudes outwardly from the bottom surface 110 of the first groove 11, the end portion of the core 31 including the first molding surface 14 is entirely or partly inserted into the vacuum through hole 32 of the peripheral portion mold 30. The opaque material is divided into the first part and the second part by the convex stage 31. The first part of the opaque material is disposed between the side surface 311 of the convex stage 31 and the side wall of the first groove 11. The second part of the shading material is disposed in the vacuum through hole 32. Secondly, the second part of the opaque material disposed in the vacuum through hole 32 is sucked out through the vacuum through hole 32, so that almost no opaque material is remained on the first molding surface 14. Thirdly, the peripheral portion 35 of the lens 50 is formed after the first part of the opaque material is cooled. Then the peripheral portion mold 30 is removed, and the inner wall of the peripheral portion 35 and the first molding surface 14 cooperatively define the second receiving room 43, i.e., the remaining space of the first receiving room 17 defines the second receiving room 43.

Figure 10:
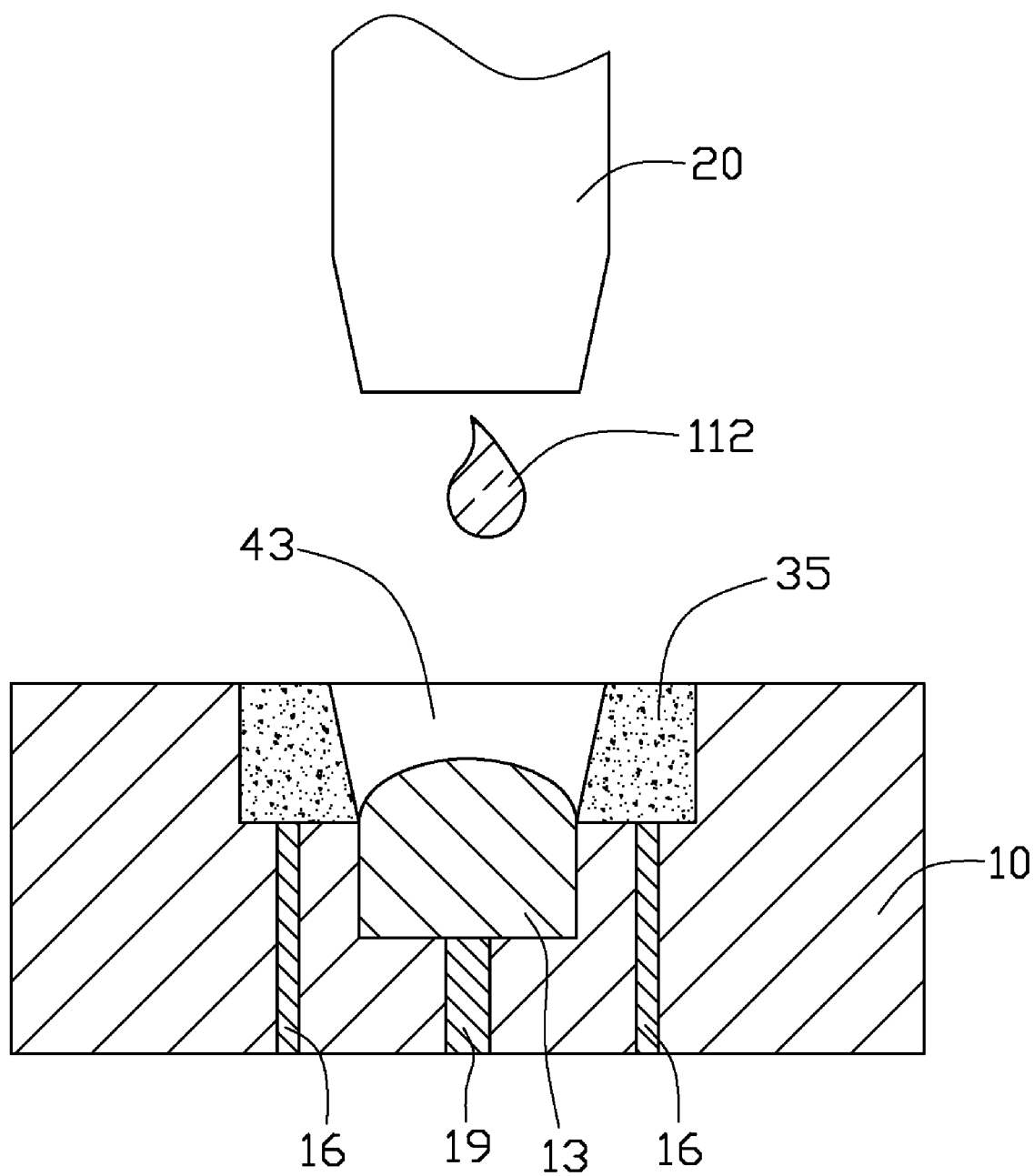

Referring to FIG. 10, in step 106, a fused molten mass of the transparent plastic material is injected into the second receiving room 43 by the charging barrel 20. The transparent plastic material includes but not limited to cyclic olefin copolymer (COC), polymethylmethacrolate (PMMA), polycarbonate (PC), PC and/or PMMA, and polyetherimide (PIE). In the present embodiment, the transparent material is PMMA. Since the melting point of the PMMA is lower than that of the liquid crystalline polymer, the fused molten mass of PMMA is not likely to influence the peripheral portion 35 of the lens 50.

Figure 11:
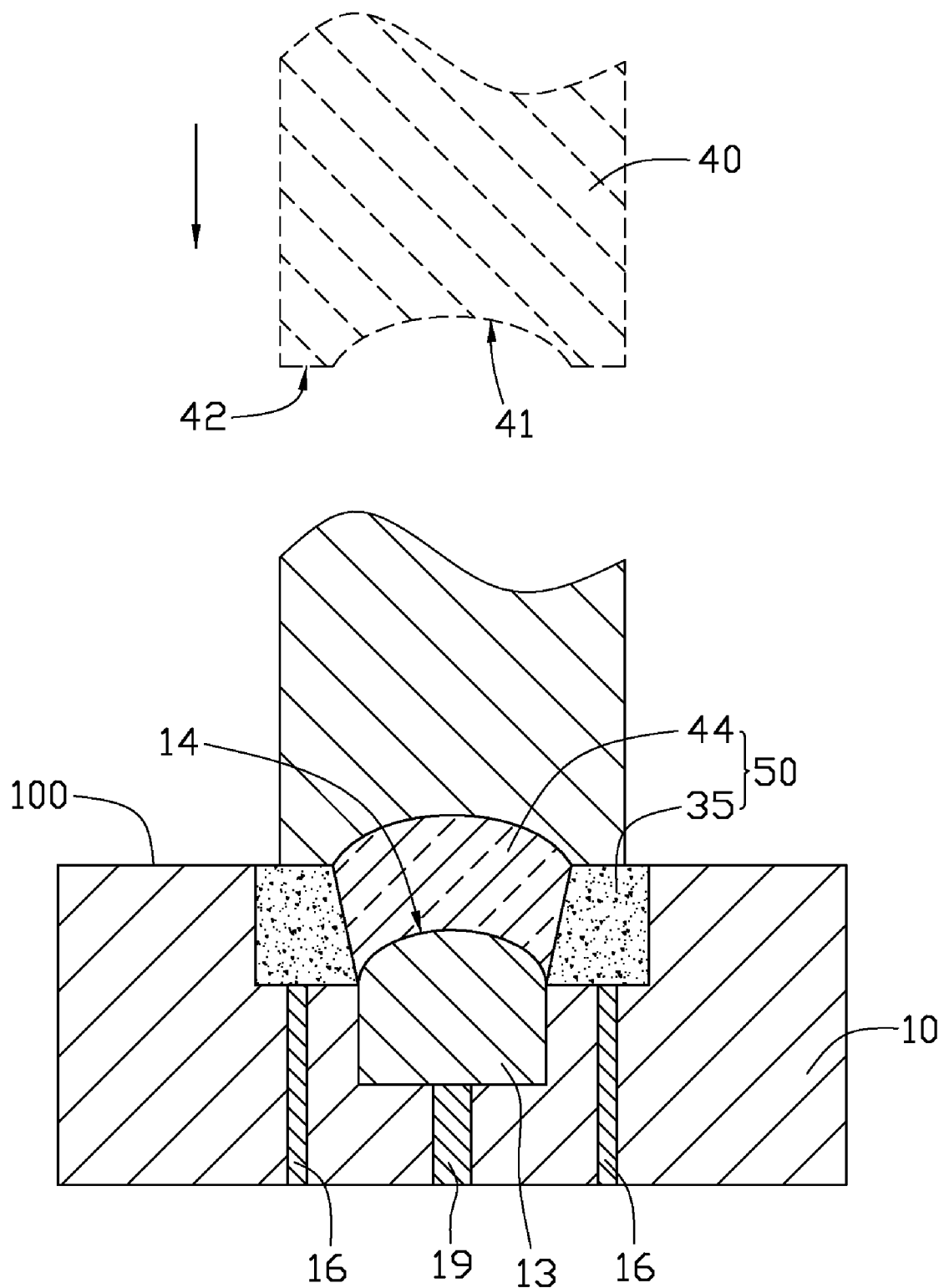

Referring to FIG. 11, in step 105, the central transparent portion mold 40 is mounted on the peripheral portion 35 of the lens 50. Firstly, the second molding surface 41 of central transparent portion mold 40 is set facing the peripheral portion 35. Meanwhile, the second molding surface 41 is kept being coaxial with the first molding surface 14. Secondly, the central transparent portion mold 40 moves towards the core 31 till the end face 42 of the central transparent portion 40 contacts the central transparent portion 35. Thirdly, the central transparent portion 35 of the lens 50 is formed after the transparent material has been cooled. Then the central transparent portion mold 40 is removed.

Figure 12:
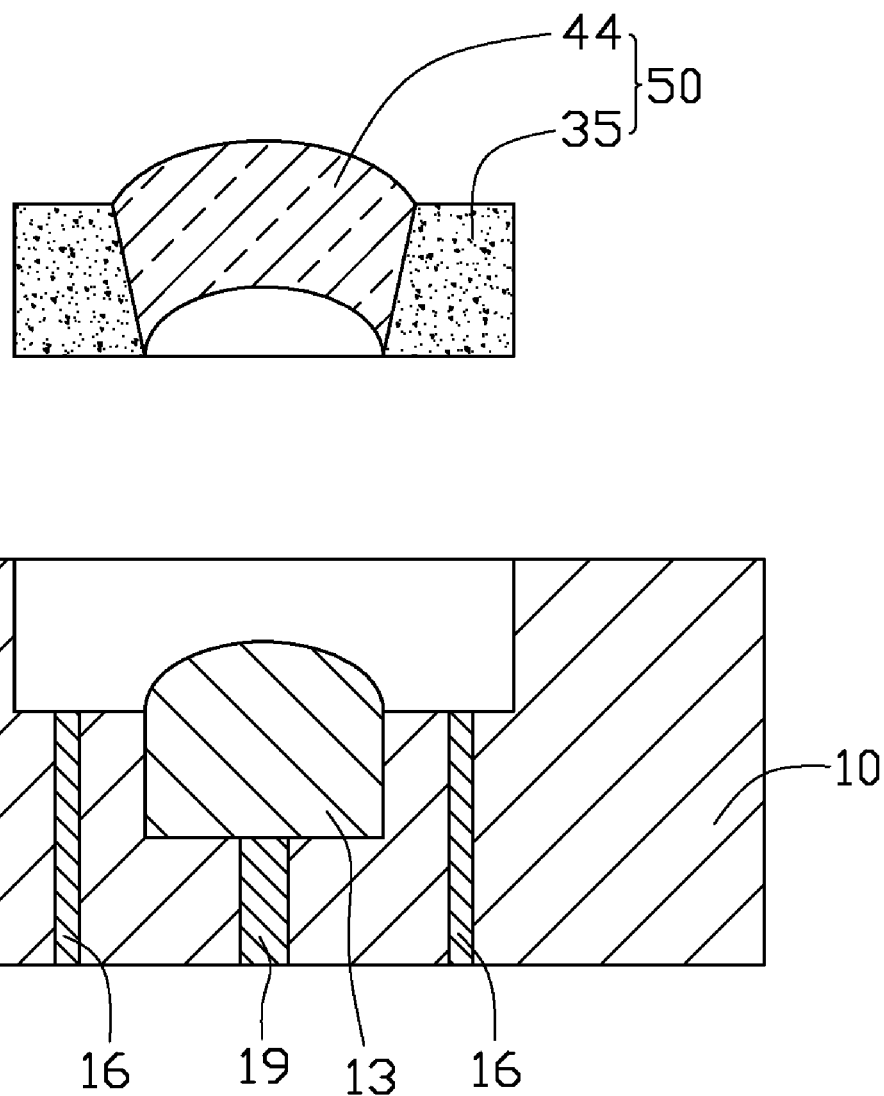

Referring to FIG. 12, in step 106, the lens 50 consisting of the central transparent portion 44 and the peripheral portion 35 is pushed by the first pins 16 and taken out from the apparatus by hands or mechanism arms.

It could be understood that, the core 13 and the central transparent portion mold 40 with different molding surface can be changed to satisfy different requirement of the lens.

As the peripheral portion of the lens 50 is made of opaque material, thus there is no need to dispose a spacer between two neighboring lenses. Accordingly, less elements are needed in the optical module. The lens 50 in the above embodiments can be easily and compactly assembled into the optical module.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method for manufacturing a lens, comprising the steps of:
    providing an apparatus including a cover die, a peripheral portion mold, and a central transparent portion mold;
    attaching the peripheral portion mold to the cover die, thereby the cover die and the peripheral portion mold cooperative defining a first receiving room;
    injecting a molten opaque or semi-opaque material into the first receiving room;
    forming a peripheral portion of the lens in the first receiving room;
    attaching the central transparent portion mold to the cover die, thereby the cover die, the peripheral portion and the central transparent portion mold cooperatively defining a second receiving room;
    injecting a molten transparent plastic material into the second receiving room; and
    forming a central transparent portion of the composite lens.

2. The method as claimed in claim 1, wherein the opaque or semi-opaque material is comprised of liquid crystalline polymers.

3. The method as claimed in claim 1, wherein the opaque or semi-opaque material is selected from a group consisting of liquid crystalline polymers, polycarbonate, and poly (acrylonitrile-butadiene-styrene).

4. The method as claimed in claim 1, wherein the transparent plastic material is selected from a group consisting of cyclic olefin copolymer, polymethylmethacrolate, polycarbonate, and polyetherimide.

5. The method as claimed in claim 1, wherein a melting point of the transparent plastic material is lower than that of the opaque or semi-opaque material.

6. The method as claimed in claim 1, wherein the peripheral portion mold comprises a vacuum through hole configured for removing residua of the opaque or semi-opaque material.

* * * * *